(12) United States Patent
He et al.

(10) Patent No.: US 8,804,837 B2
(45) Date of Patent: *Aug. 12, 2014

(54) METHOD AND SYSTEM FOR CODING MODE SELECTION IN VIDEO COMPRESSION SYSTEMS

(75) Inventors: Dake He, Yorktown Heights, NY (US); Ashish Jagmohan, Irvington, NY (US); Ligang Lu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,414

(22) Filed: Jul. 10, 2012

(65) Prior Publication Data

US 2012/0281750 A1    Nov. 8, 2012

Related U.S. Application Data

(63) Continuation of application No. 12/044,027, filed on Mar. 7, 2008, now Pat. No. 8,295,356.

(51) Int. Cl.
*H04N 11/02* (2006.01)

(52) U.S. Cl.
USPC .................................. 375/240.2; 375/240.23

(58) Field of Classification Search
USPC .......................................... 375/240.2, 240.23
See application file for complete search history.

(56) References Cited

U.S. PATENT DOCUMENTS

| | | | |
|---|---|---|---|
| 6,144,769 A | 11/2000 | Sato et al. | |
| 6,167,162 A | 12/2000 | Jacquin et al. | |
| 6,975,680 B2 | 12/2005 | Demos | |
| 7,194,035 B2 | 3/2007 | Dumitras et al. | |
| 7,433,824 B2 | 10/2008 | Mehrotra et al. | |
| 2003/0086495 A1 | 5/2003 | Cheung | |
| 2003/0108102 A1 | 6/2003 | Demos | |
| 2005/0031034 A1 | 2/2005 | Kamaci et al. | |
| 2005/0249277 A1 | 11/2005 | Ratakonda et al. | |
| 2006/0120458 A1 | 6/2006 | Kodama et al. | |
| 2006/0132334 A1 | 6/2006 | Malvar | |
| 2006/0182174 A1 | 8/2006 | Kuo | |

(Continued)

OTHER PUBLICATIONS

Gao, et al., "An Improved Fast Mode Decision Algorithm in H.264 for Video Communications", pp. 57-60, Dec. 20, 2005.

(Continued)

*Primary Examiner* — Dang Ton
*Assistant Examiner* — Ryan Kavleski
(74) *Attorney, Agent, or Firm* — Scully Scott Murphy & Presser PC; Gail H. Zarick, Esq.

(57) ABSTRACT

A method and system are disclosed for selecting a mode to encode video data. The method comprises the steps of (a) transforming a source video frame into a set of coefficients, (b) partitioning said set of coefficients into a plurality of subsets of the coefficients on the basis of probability statistics corresponding to a plurality of encoding modes, wherein each of said subsets is identified for encoding by one of the plurality of encoding modes. The method comprises the further steps of (c) for each of the plurality of subsets of coefficients, computing defined parameters of an associated probability distribution for said subset, and (d) repeating steps (b) and (c) until a predetermined termination condition is satisfied. When this predetermined termination condition is satisfied, the subsets of coefficients, as they exist at that time, are output to a video encoder, which preferably is a Wyner-Ziv encoder.

20 Claims, 4 Drawing Sheets

(56) References Cited

U.S. PATENT DOCUMENTS

| | | |
|---|---|---|
| 2007/0016415 A1 | 1/2007 | Thumpudi et al. |
| 2007/0121731 A1* | 5/2007 | Tanizawa et al. ........ 375/240.24 |
| 2008/0291065 A1 | 11/2008 | Lu et al. |
| 2009/0034857 A1* | 2/2009 | Moriya et al. ................ 382/238 |
| 2009/0110067 A1 | 4/2009 | Sekiguchi et al. |

OTHER PUBLICATIONS

Lin, et al., "Fast Mode Decision for H.264 Based on Rate-Distortion Cost Estimation".

* cited by examiner

METHOD AND SYSTEM FOR CODING MODE SELECTION IN VIDEO COMPRESSION SYSTEMS

CROSS REFERENCE TO RELATED APPLICATION

This application is a continuation of U.S. patent application Ser. No. 12/044,027, filed Mar. 7, 2008, now U.S. Pat No. 8,295,356 issued Oct. 23, 2012, the entire content and disclosure of which is hereby incorporated herein by reference.

BACKGROUND OF THE INVENTION

1. Field of the Invention

This invention generally relates to video compression, and more specifically, the invention relates to a method and system for selecting between a plurality of compression modes in a video encoder. Even more specifically, the preferred embodiment of the invention relates to such a method and system for use in a Wyner-Ziv video encoder.

2. Background Art

Encoder mode selection is an important problem in video compression systems. In general, video compression systems employ a plurality of modes such as independent coding modes (conventionally termed Intra modes), differentially predicted codes (conventionally termed Inter modes), skip coding modes etc. Given a video frame to be compressed, a conventional video encoder typically selects the best encoding mode to be used for each block of pixels or transform coefficients in the video frame. The encoder mode for each block is selected with the aim of providing the best compression performance, i.e. the minimum compression rate and/or the best reconstruction quality. Wyner-Ziv video encoders differ from conventional differential pulse code modulation (DPCM) based video encoders in that encoding are typically performed on large coefficient vectors rather than on blocks of coefficients. Further the rate required to compress any component coefficient of this vector depends on the global probability distribution of the entire probability vector.

Previous methods for mode selection in DPCM encoders fall into two main categories. The first class of methods, shown in FIG. 1, employs multiple encoder runs for each block, using each of the available encoding modes. This involves, at 102 and 104, transform coding, quantization, and entropy coding of the block using each available encoding mode. After encoding, the compression rate and reconstruction distortion for each encoding mode are computed at 112 and 114. Typically, these are combined to form a Lagrangian (R+λD) which can be computed for each mode. The encoded mode selected at 122 is, then, the mode which minimizes the Lagrangian. Examples of this class of solutions include the method implemented in the rate-distortion optimized H.264 reference encoder, as well as the methods described in U.S. patent application Ser. No. 2006/0182174A1: 'Method for coding mode selection of intra prediction in video compression', U.S. Pat. No. 6,975,680B2: 'Macroblock mode decision biasing for video compression systems', and U.S. Pat. No. 7,194,035: 'Method and apparatus for improved coding mode selection'. The main shortcomings of these approaches are the high computational complexity. In fact, these approaches are computationally infeasible for vector-based encoding as used in Wyner-Ziv encoders, since these would require encoding of each possible combination of modes for the entire vector (and thus complexity would be exponential in the length of the vector).

The second class of methods, shown in FIG. 2, eliminate the need for multiple encodings by evaluating, at 202 and 204, certain mode-dependent functions (termed features) on each block. Typically, these are energy-measuring functions such as the sum of absolute (transform) differences, block intensity/transform variance, and sum of absolute values of subsets of frequency coefficients. Examples of this class of solutions include the method implemented in the SATD optimized H.264 reference encoder, as well as the methods described in U.S. Pat. No. 6,144,769: 'Video coding device and decoding device', U.S. Pat. No. 6,167,162: 'Rate-distortion optimized coding mode selection for video coders', U.S. patent application Ser. No. 2003/0086495A1, 'Method and system for optimizing mode selection for video coding', and U.S. patent application Ser. No. 2005/0249277A1: 'Method and apparatus to determine prediction modes to achieve fast video encoding.' The main shortcoming of these approaches in the context of Wyner-Ziv video encoders is that they are not suited to making mode selection decisions between multiple Wyner-Ziv modes. This is a result of the fact that these approaches ignore the global Wyner-Ziv encoded vector probability distribution during the mode selection process.

Therefore, a need exists for an improved method for mode selection for a Wyner-Ziv video encoder, which requires low computational complexity, and which provides high compression efficiency by accounting for the global probability distribution.

SUMMARY OF THE INVENTION

It is an object of this invention to improve methods and systems for mode selection in a video encoder. Another object of the present invention is to provide an improved method for mode selection for a video encoder, which requires low computational complexity, and which provides high compression efficiency by accounting for the global probability distribution.

A further object of the invention is to provide a method and system for selecting a video-encoding mode that is particularly well suited for use in a Wyner-Ziv video encoder.

These and other objectives are attained with a method and system for selecting a mode to encode video data. The method comprises the steps of (a) transforming a source video frame into a set of coefficients, (b) partitioning said set of coefficients into a plurality of subsets of the coefficients on the basis of probability statistics corresponding to a plurality of encoding modes, wherein each of said subsets is identified for encoding by one of the plurality of encoding modes. The method comprises the further steps of (c) for each of the plurality of subsets of coefficients, computing defined parameters of an associated probability distribution for said subset, and (d) repeating steps (b) and (c) until a predetermined termination condition is satisfied. When this predetermined termination condition is satisfied, the subsets of coefficients, as they exist at that time, are output to a video encoder.

In the preferred embodiment of the invention, the coefficients are portioned into subsets on the basis of a partitioning vector. Also, in this embodiment, the computing step includes the step of revising the partition vector based on said probability distribution. This revising step, in turn, includes the steps of (i) for each of the coefficients, selecting one of the plurality of encoding modes as a new encoding mode for said each coefficient based on the associated probability distribution, and (ii) revising the partition vector based on the new encoding modes.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The present invention generally relates to video compression. Conventional video compression systems, as standardized by MPEG, rely on a complex, sophisticated encoder that exploits the statistical correlation among neighboring video frames to achieve good compression performance. In emerging applications like video surveillance, mobile multimedia, video conferencing, video gaming, and battlefield video communications, however, a simple, low-cost encoder with low computational complexity is instead desired. In an effort to reduce encoding computational complexity, one approach proposed recently is to apply the principle of Wyner-Ziv coding to shift the computational load from the encoder to the decoder.

Briefly speaking, in Wyner-Ziv coding, the decoder has access to side information that is not available to the encoder; and such side information can still be exploited to achieve greater compression than would otherwise be possible. Therefore, with the objective to achieve very low encoding complexity, Wyner-Ziv video coding systems exploit the statistical correlation among neighboring video frames only at the decoder, and thus relieve the encoder of significant computational load.

In general, a Wyner-Ziv video compression system is comprised of a video encoder, which compresses (or encodes) a video signal into a compressed video frame, and a video decoder, which decompresses (or decodes) the compressed video frame to produce a reconstructed video frame. At any time instant, a video frame V is to be encoded by the encoder. Since the decoder has access to the previously decoded frame $V_o$, it can generate prior knowledge about V from the previously decoded frame $V_o$, and use this knowledge in the decoding process. Being aware of the existence of the prior knowledge about $V_o$ at the decoder, the encoder can transmit fewer bits, and thus achieve greater compression, than would otherwise be possible.

As mentioned above, a need exists for an improved method for mode selection for a Wyner-Ziv video encoder, which requires low computational complexity, and which provides high compression efficiency by accounting for the global probability distribution. The present invention provides such a mode selection.

Figure 1:
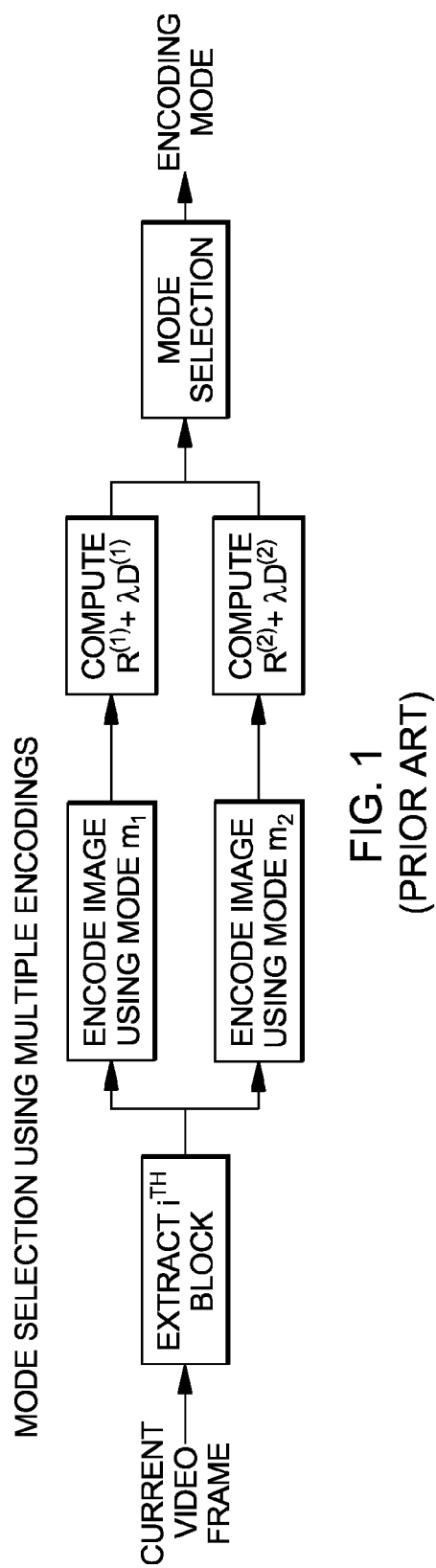
FIG. 1 shows a prior art video mode selection procedure.
Figure 2:
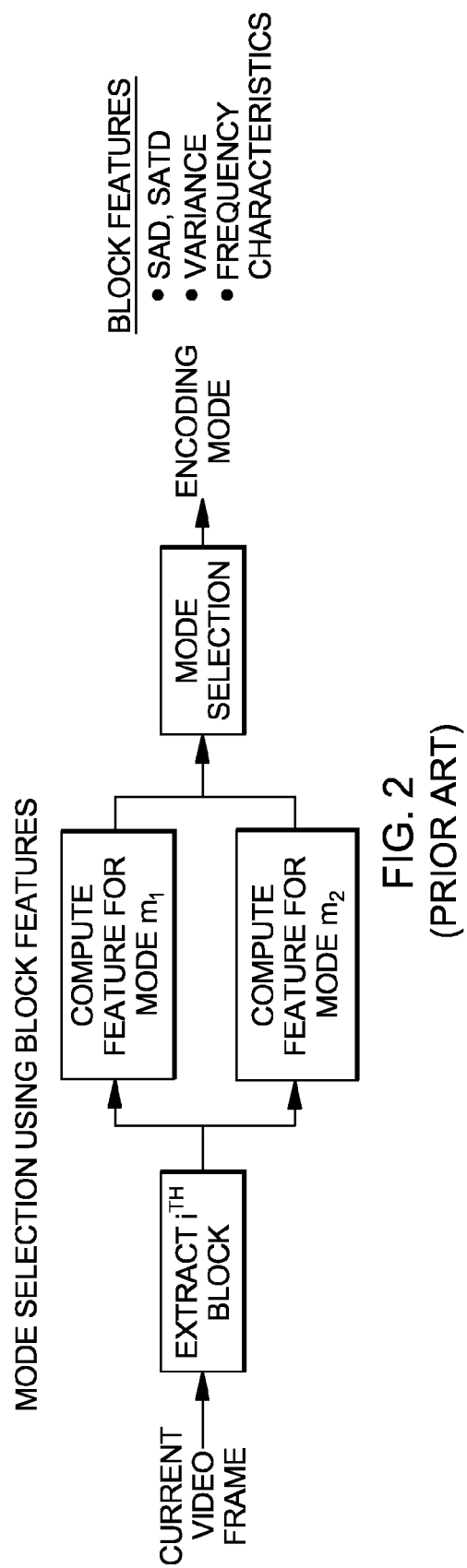
FIG. 2 shows a second prior art video mode selection procedure.
Figure 3:
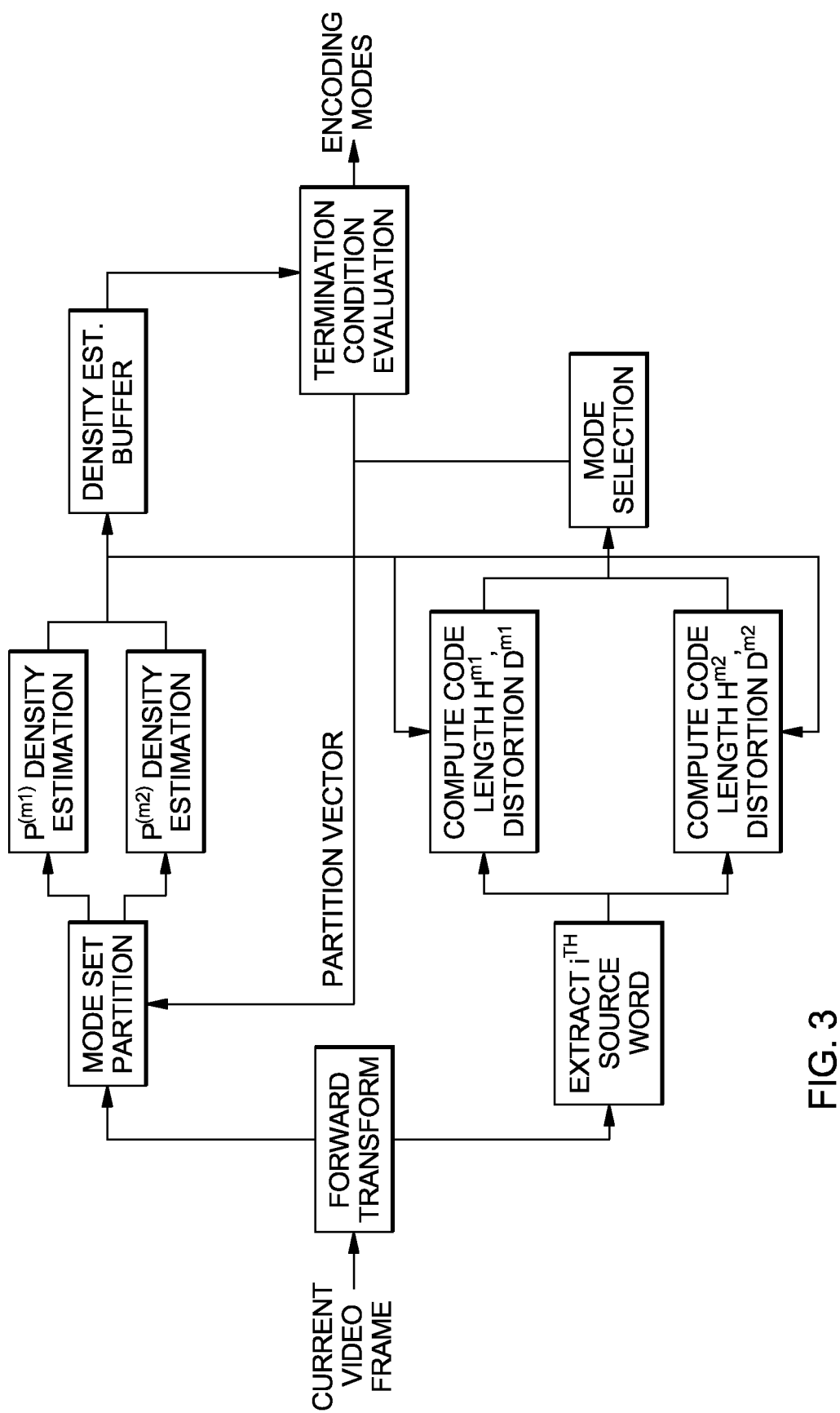
FIG. 3 illustrates a mode selection process embodying the present invention.

The preferred embodiment of the invention, for selecting between two encoding modes, is shown in FIG. 3. The video frame to be encoded is first transformed at 302 using an energy-compacting transform such as the DCT transform, a wavelet transform, or the H.264 4×4 integer transform. The coefficients are then partitioned at 304 into two subsets on the basis of the current partition vector. The partition vector contains, for each coefficient, a value indicating whether the coefficient is to be encoded using mode m1 or if it is to be encoded using mode m2. The partition set of coefficients to be encoded using mode m1 are input to a probability density estimator 306 which computes the parameters of a probability distribution Pm1 which fits these coefficients well. Similarly, the partition set of coefficients to be encoded using mode Pm2 are input to a probability density estimator 310, which computes the parameters of a probability distribution which fits these coefficients well.

For each coefficient (or grouping of coefficients) in the input video frame, an ideal codeword length is computed at 312 as a function of the density Pm1. Further, a reconstruction distortion is computed as a function of the density Pm1 and the quantizer used to encode the coefficients. Similarly, a second ideal codeword length is computed as a function of the density Pm2, and a reconstruction distortion is computed at 314 as a function of the density Pm2 and the quantizer used to encode the coefficients. Next an encoding mode is selected at 316 for the coefficient, or grouping of coefficients, based on the mode which minimizes a weighted sum of the ideal codeword length and the reconstruction distortion. Once an encoding mode has been selected for each coefficient or coefficient group, the mode decisions are combined to form a new partition vector.

The coefficients of the current video frame are then re-partitioned using the newly estimated partition vector. The probability densities corresponding to each mode are then recomputed. The ideal codeword lengths and reconstruction distortion length are computed afresh using the recomputed densities, and these are used to compute a new mode selection partition vector. Thus, an iterative process is used in which the two processes of density estimation and partition estimation are iterated between. The iterative process is terminated, as represented at 320, when the current density estimates are very close (using, for example, an Lp norm distance measure) to previously computed density estimates stored in the density estimate buffer. Upon termination, the current partition vector is output as the mode selection. The Wyner-Ziv encoder for compression of the video frame uses these encoding modes.

An important benefit of this method is its suitability for low-complexity Wyner-Ziv coding, since the method of this invention has low computational complexity, and it explicitly takes into account the global probability distribution of each mode vector in determining the rate and distortion induced by that mode.

The method is provably convergent if the density estimates are known to belong to a parametric class of distributions, and provides excellent compression performance in practice.

Figure 4:
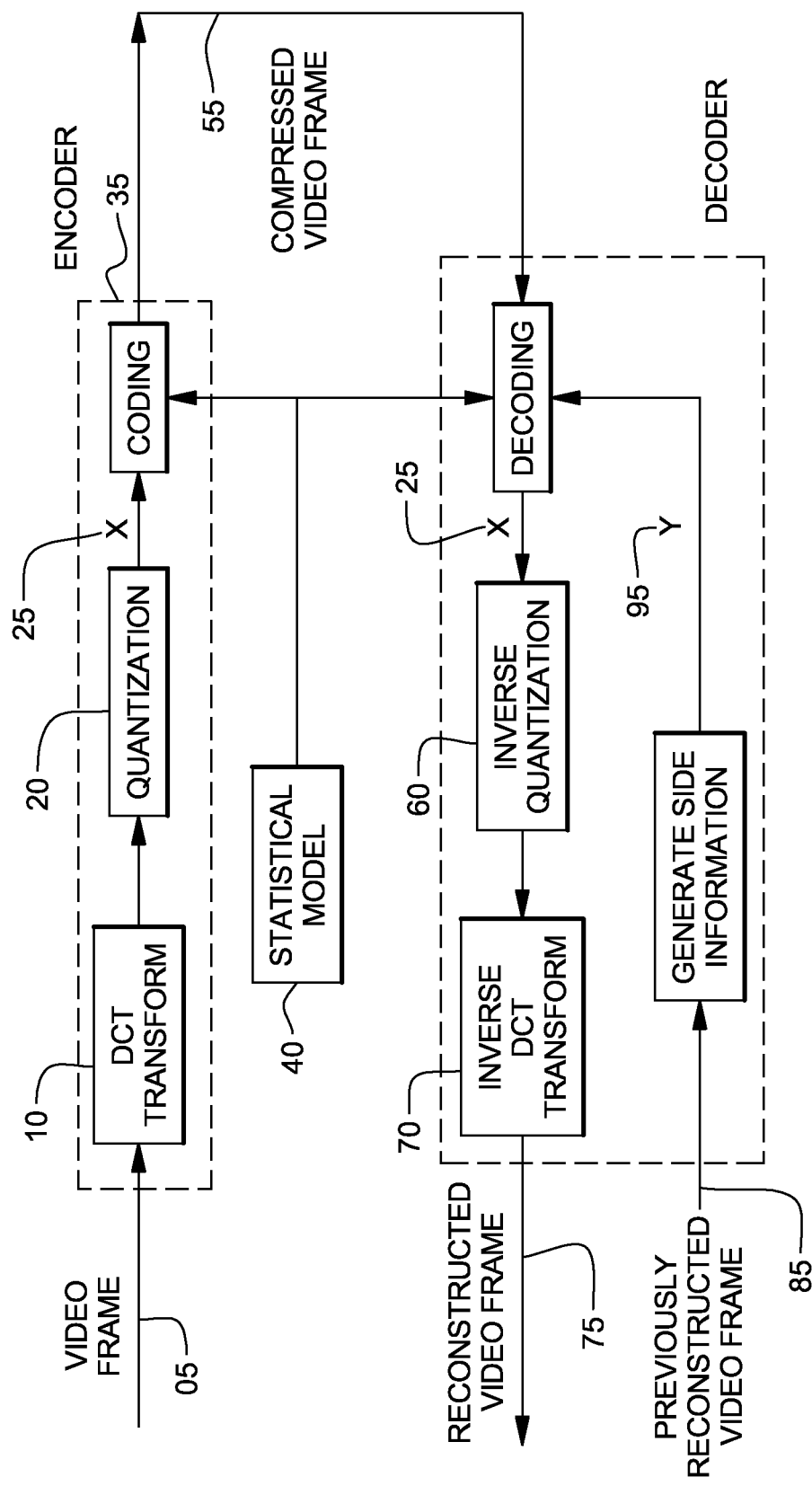
FIG. 4 shows a Wyner-Ziv video compression system employing this invention.

FIG. 4 illustrates a Wyner-Ziv video compression system 400 employing the present invention. System 400, in general, comprises a video encoder 435, which compresses (or encodes) a video signal 405 into a compressed video frame 455, and a video decoder 445, which decompresses (or decodes) the compressed video frame 455 to produce reconstructed video frame 475. At any time instant, a video frame V 405 is to be encoded by the encoder 435. Since the decoder 445 has access to the previously decoded frame 485, it can generate prior knowledge 490 about V 405 from the previously decoded frame 485, and use this knowledge in the decoding process 450. Being aware of the existence of the prior knowledge 490 about V 405 at the decoder 445, the encoder 435 can transmit fewer bits, and thus achieve greater compression, than would otherwise be possible.

In operation, the encoder first compresses V 405 by using a discrete cosine transform (DCT) 410, and quantization 420

(equivalent to the intra mode transform and quantization in MPEG coding). The resultant signal x 425 is called the quantized sequence, and takes value in a discrete set.

It may be noted that although the side information y 495 is not assumed on the encoder side, the encoder 435 needs to know the statistical relationship between x 425 and y 495 as reflected in the statistical model 440 in order to encode x 425. For the purpose of reducing encoding complexity, the statistical model should be estimated by using computationally efficient methods in Wyner-Ziv video compression systems. Also, as will be understood by those of ordinary skill in the art, in principal, the encoder 235 and the decoder 245 may be distant from one another.

The method of the present invention will be generally implemented by a computer executing a sequence of program instructions for carrying out the steps of the method and may be embodied in a computer program product comprising media storing the program instructions. For example, FIG. 6 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments.

Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

Figure 5:
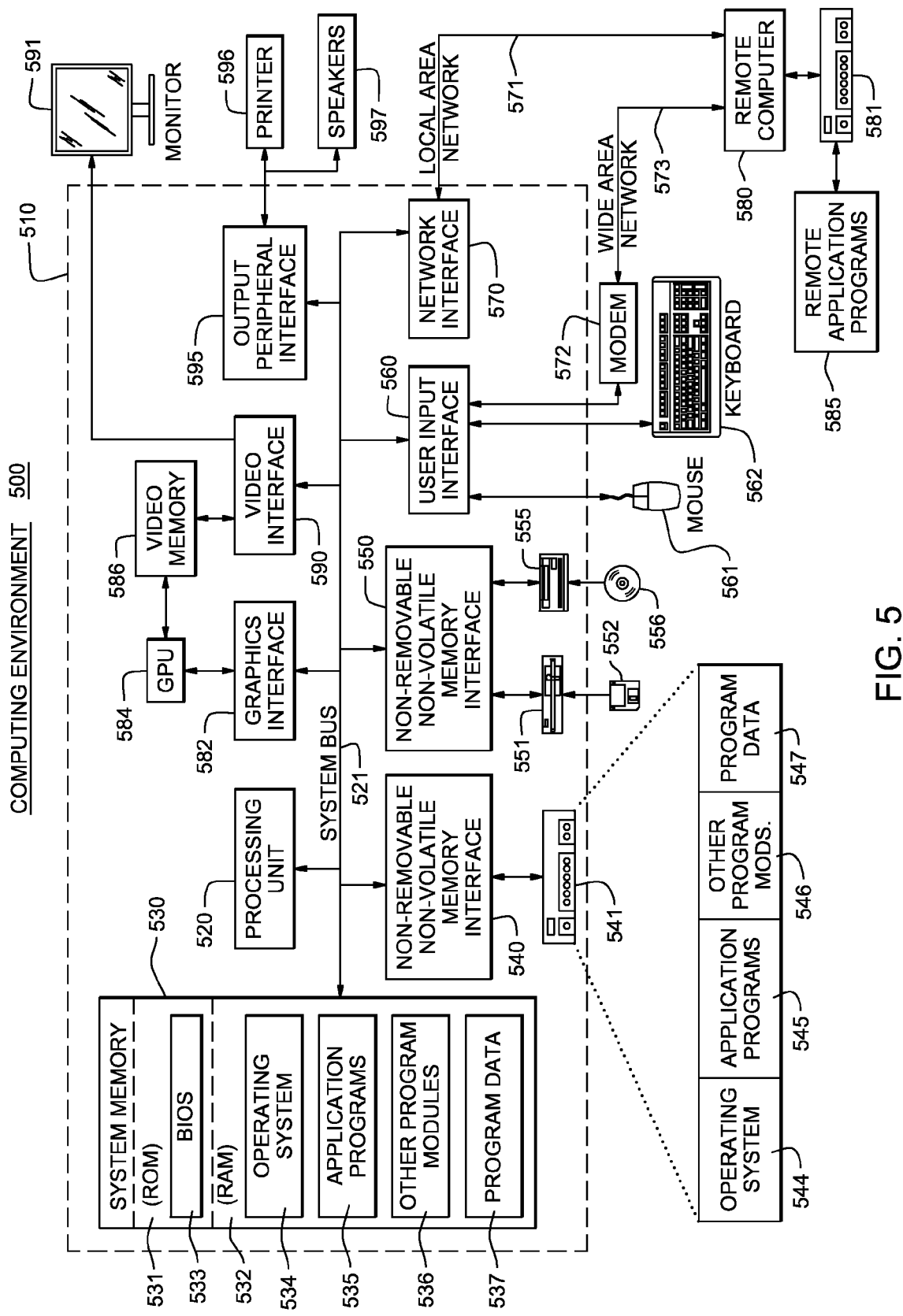
FIG. 5 is a block diagram of an exemplary computing environment in which the invention may be implemented.

FIG. 5, thus, illustrates an example of a suitable computing system environment 500 in which the invention may be implemented, although as made clear above, the computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

With reference to FIG. 5, an exemplary system for implementing the invention includes a general purpose-computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIGS. 4-6 illustrate operating system 534, application programs 535, other program modules 536, and program data 537.

The computer 510 may also include other removable/non-removable, volatile/nonvolatile computer storage media. By way of example only, FIGS. 4-6 illustrate a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 6 provide storage of computer readable instructions, data structures, program modules and other data for the computer 510. In FIG. 6, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. A graphics interface 582, such as Northbridge, may also be connected to the system bus 521. Northbridge is a chipset that communicates with the CPU, or processing unit 520, and assumes responsibility for accelerated graphics port (AGP) communications. One or more graphics processing units (GPUs) 584 may communicate with graphics interface 582. In this regard, GPUs 584 generally include on-chip memory storage, such as register storage and GPUs 584 communicate with a video memory 586. GPUs 584, however, are but one example of a coprocessor and thus a variety of co-processing devices may be included in computer 510. A monitor 591 or other type of display device is also connected to the system bus 521 via an interface, such as a video interface 590, which may in turn communicate with video memory 586. In addition to monitor 591, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

One of ordinary skill in the art can appreciate that a computer 510 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled n the art, and it is intended that the appended claims cover all such modifications and embodiments as fall within the true spirit and scope of the present invention.

What is claimed is:

1. A method of selecting a mode to encode video data, the method comprising the steps of:
transforming a source video frame into a set of coefficients;
determining, in a defined cycle, one of a plurality of encoding modes for each coefficient of the set of coefficients, said defined cycle including:
partitioning said set of coefficients into a first plurality of subsets of the coefficients based on specified probability statistics corresponding to the plurality of encoding modes;

computing defined parameters of a probability distribution for each of the subsets of the coefficients;

selecting one of the encoding modes for each of the coefficients based on a weighted sum of said computed defined parameters; and re-partitioning the set of coefficients into a second plurality of subsets of the coefficients based on the encoding modes selected for the coefficients; and outputting the second plurality of subsets of the coefficients to a video encoder to encode each of the subsets of the coefficients using the one of the encoding modes selected for the coefficients of said each of the second plurality of subsets of the coefficients.

2. A method of selecting a mode to encode video data, the method comprising the steps of:

transforming a source video frame into a set of coefficients;

partitioning said set of coefficients into a plurality of subsets of the coefficients on the basis of probability statistics corresponding to a plurality of encoding modes, wherein each of said subsets is identified for encoding by one of the plurality of encoding modes;

for each of the plurality of subsets of coefficients, computing defined parameters of an associated probability distribution for said subset;

repeating the partitioning and computing steps until a predetermined termination condition is satisfied; and when said predetermined termination condition is satisfied, outputting the subsets of coefficients, when said predetermined termination condition is satisfied, to a video encoder; and wherein:

the partitioning step includes the step of partitioning the coefficients into said subsets on the basis of a partition vector;

the computing step includes the step of revising the partition vector based on said probability distribution, including the steps of for each of the coefficients, selecting one of the plurality of encoding modes as a new encoding mode for said each coefficient based on a weighted sum of said computed defined parameters, and revising the partition vector based on the new encoding modes.

3. A method according to claim 2, wherein the partition vector includes, for each coefficient, a value indicating the encoding mode to be used for encoding said each coefficient.

4. A method according to claim 2, wherein:

the plurality of subsets includes at least first and second subsets;

the plurality of encoding modes includes at least a first encoding mode m1 and a second encoding mode m2;

the computing step includes the steps of inputting into a first probability density estimator, the first subset of coefficients, and using said first probability density estimator to compute parameters of a probability distribution $P^{m1}$ for the first subset of coefficients.

5. A method according to claim 4, wherein the computing step includes the further steps of inputting into a second probability density estimator, the second subset of coefficients, and using said second probability density estimator to compute parameters of a probability distribution $P^{m2}$ for the second subset of coefficients.

6. A method according to claim 5, wherein the revising step includes the steps of:

for each of the coefficients, selecting one of the encoding modes m1 or m2 as a new encoding mode for said each coefficient based on the probability distributions $P^{m1}$ and $p^{m2}$; and revising the partition vector based on the new encoding modes.

7. A method according to claim 6, wherein the predetermined termination condition is satisfied when the probability distributions $P^{m1}$ and $p^{m2}$ meet defined criteria.

8. A method according to claim 7, wherein the defined criteria are met when the probability distributions $P^{m1}$ and $P^{m2}$ are between defined values.

9. A method according to claim 5, wherein:

the computing step includes the further steps of:

for the first subset of coefficients, computing a first ideal codeword length and a reconstruction distortion as functions of $P^{m1}$; and for the second subset of coefficients, computing a second ideal codeword length and a reconstruction distortion as functions of $P^{m2}$; and the selecting one of the encoding modes includes selecting one of the plurality of encoding modes as a new encoding mode for each coefficient based on the ideal codeword length and the reconstruction distortion computed for said each coefficient.

10. A method according to claim 2, wherein said video encoder is a Wyner-Ziv encoder.

11. A computer system for selecting a mode to encode video data, the computer system comprising one or more processing units configured for:

transforming a source video frame into a set of coefficients;

determining, in a defined cycle, one of a plurality of encoding modes for each coefficient of the set of coefficients, said defined cycle including:

partitioning said set of coefficients into a first plurality of subsets of the coefficients based on a specified partition vector;

computing defined parameters of a probability distribution for each of the subsets of the coefficients;

selecting one of the encoding modes for each of the coefficients based on a weighted sum of said computed defined parameters; and re-partitioning the set of coefficients into a second plurality of subsets of the coefficients based on the encoding modes selected for the coefficients; and outputting the second plurality of subsets of the coefficients to a video encoder to encode each of the subsets of the coefficients using the one of the encoding modes selected for the coefficients of said each of the second plurality of subsets of the coefficients.

12. A computer system according to claim 11, wherein:

the computed defined parameters include a codeword length and a reconstruction distortion for each of the coefficients of the first plurality of the subsets of the coefficients; and the partition vector is revised by:

for each of the coefficients, selecting one of the plurality of encoding modes as a new encoding mode for said each coefficient based on the weighted sum of the codeword length and the reconstruction distortion for said each coefficient; and revising the partition vector based on the new encoding modes.

13. A computer system according to claim 11, wherein:

the first plurality of subsets includes at least first and second subsets;

the plurality of encoding modes includes at least a first encoding mode m1 and a second encoding mode m2;

the defined parameters are computed by inputting into a first probability density estimator, the first subset of coefficients, using said first probability density estimator to compute parameters of a probability distribution $P^{m1}$ for the first subset of coefficients, inputting into a second probability density estimator, the second subset of coefficients, and using said second probability density estimator to compute parameters of a probability distribution $P^{m2}$ for the second subset of coefficients.

14. A computer system according to claim 13, wherein the partition vector is revised by:

for each of the coefficients, selecting one of the encoding modes m1 or m2 as a new encoding mode for said each coefficient based on the probability distributions $P^{m1}$ and $P^{m2}$; and revising the partition vector based on the new encoding modes.

15. A computer system according to claim 14, wherein the predetermined termination condition is satisfied when the probability distributions $P^{m1}$ and $P^{m2}$ are between defined values.

16. An article of manufacture comprising:

at least one computer usable device having computer readable program code logic tangibly embodied therein to execute a machine instruction in a processing unit for selecting a mode to encode video data, said computer readable program code logic when executing performing the following steps:

transforming a source video frame into a set of coefficients;

determining, in a defined cycle, one of a plurality of encoding modes for each coefficient of the set of coefficients, said defined cycle including:

partitioning said set of coefficients into a first plurality of subsets of the coefficients based a specified partition vector, computing defined parameters of a probability distribution for each of the subsets of the coefficients ;

selecting one of the encoding modes for each of the coefficients based on a weighted sum of said computed defined parameters; and re-partitioning the set of coefficients into a second plurality of subsets of the coefficients based on the encoding modes selected for the coefficients; and outputting the second plurality of subsets of the coefficients, to a video encoder to encode each of the subsets of the coefficients using the one of the encoding modes selected for the coefficients of said each of the second plurality of subsets of the coefficients.

17. An article of manufacture according to claim 16, wherein:

the first plurality of subsets include at least first and second subsets;

the plurality of encoding modes includes at least a first encoding mode m1 and a second encoding mode m2;

the computing step defined parameters includes the steps of inputting into a first probability density estimator, the first subset of coefficients, using said first probability density estimator to compute parameters of a probability distribution $P^{m1}$ for the first subset of coefficients, inputting into a second probability density estimator, the second subset of coefficients, and using said second probability density estimator to compute parameters of a probability distribution $P^{m2}$ for the second subset of coefficients, and the revising step includes the steps of for each of the coefficients, selecting one of the encoding modes m1 or m2 as a new encoding mode for said each coefficient based on the probability distributions $P^{m1}$ and $P^{m2}$, and revising the partition vector based on the new encoding modes.

18. An article of manufacture according to claim 17, wherein the predetermined termination condition is satisfied when the probability distributions $P^{m1}$ and $P^{m2}$ meet defined criteria.

19. An article of manufacture according to claim 18, wherein the defined criteria are met when the probability distributions $P^{m1}$ and $P^{m2}$ are between defined values.

20. An article of manufacture according to claim 17, wherein the computing step includes the further steps of:

for the first subset of coefficients, computing a first ideal codeword length as a function of $P^{m1}$; and for the second subset of coefficients, computing a second ideal codeword length as a function of $P^{m2}$.

\* \* \* \* \*